(12) United States Patent
Rose

(10) Patent No.: US 6,768,797 B2
(45) Date of Patent: Jul. 27, 2004

(54) METHOD AND APPARATUS FOR ENCRYPTING DATA IN A WIRELESS COMMUNICATION SYSTEM

(75) Inventor: Gregory G. Rose, New South Wales (AU)

(73) Assignee: Qualcomm, Inc., San Diego, CA (US)

( * ) Notice: Subject to any disclaimer, the term of this patent is extended or adjusted under 35 U.S.C. 154(b) by 12 days.

(21) Appl. No.: 10/434,749

(22) Filed: May 9, 2003

(65) Prior Publication Data

US 2003/0185390 A1 Oct. 2, 2003

Related U.S. Application Data

(63) Continuation of application No. 10/081,750, filed on Feb. 21, 2002, now abandoned, which is a continuation of application No. 09/369,382, filed on Aug. 5, 1999, now Pat. No. 6,385,316, which is a continuation of application No. 08/815,347, filed on Mar. 11, 1997, now Pat. No. 6,075,859.

(51) Int. Cl.[7] .............................................. H04K 1/00
(52) U.S. Cl. ......................... 380/247; 380/28; 380/44; 380/250; 380/270; 713/200; 455/410; 455/411
(58) Field of Search .............................. 455/410, 411; 380/28, 44, 247, 259, 270; 713/200

(56) References Cited

U.S. PATENT DOCUMENTS

| | | | | |
|---|---|---|---|---|
| 4,275,265 A | * | 6/1981 | Davida et al. ................. | 380/29 |
| 5,159,634 A | * | 10/1992 | Reeds, III ..................... | 380/42 |
| 5,214,703 A | * | 5/1993 | Massey et al. ................ | 380/37 |
| 5,687,238 A | * | 11/1997 | Shimada ....................... | 380/42 |
| 5,794,139 A | * | 8/1998 | Mizikovsky et al. ....... | 455/403 |
| 5,991,407 A | * | 11/1999 | Murto ......................... | 380/248 |
| 6,075,859 A | * | 6/2000 | Rose ........................... | 380/247 |
| 6,266,411 B1 | * | 7/2001 | Etzel et al. ................... | 380/28 |
| 6,377,687 B1 | * | 4/2002 | Etzel et al. ................... | 380/28 |
| 6,385,316 B1 | * | 5/2002 | Rose ............................ | 380/28 |
| 6,393,270 B1 | * | 5/2002 | Austin et al. ............... | 455/411 |

\* cited by examiner

*Primary Examiner*—Gregory Morse
*Assistant Examiner*—Paul E. Callahan
(74) *Attorney, Agent, or Firm*—Wadsworth, Philip Minhas, Sandip S. Choi, Jae-Hee

(57) ABSTRACT

In a communications system, a method of transforming a set of message signals representing a message comprising the steps of first encoding one of the set of message signals in accordance with a first keyed transformation, a second encoding of the one of the set of message signals in accordance with at least one additional keyed transformation, a third encoding of the one of the set of message signals in accordance with a self inverting transformation in which at least one of the set of message signals is altered, a fourth encoding of the one of the set of message signals in accordance with at least one additional inverse keyed transformation wherein each of the at least one additional inverse keyed transformation is a corresponding inverse of at least one additional keyed transformation, and fifth encoding the one of the set of message signals in accordance with first inverse keyed transformation wherein the first inverse keyed transformation is the inverse of the first keyed transformation.

20 Claims, 6 Drawing Sheets

```
/* BEVL - BLOCK ENCRYPTION VARIABLE LENGTH */
unsigned char key[8];

unsigned char t1box[256] = {
#include "t1.h"
};
unsigned char t2box[256] = {
#include "t2.h"
};

unsigned char
tbox (unsigned char B[256], unsigned char tv)
{
        unsigned char      t;

t = B[tv ^ key[0]];
        t = B[(t + key[1]) & 0xFF];
        t = B[t ^ key[2]];
        t = B[t + key[3]) & 0xFF];
        t = B[t ^ key[4]];
        t = B[t + key [5]) & 0xFF];
        t = B[t ^ key[6]];
        t = B[t + key[7]) & 0xff];
        t = B[t ^ key[0]];
        return t;
} void
bevl(unsigned char *buf, int n)
{
        int                i;
        unsigned char      t, v;

for (v = i = 0; i < n; ++i) {
                buf[i] += tbox(t1box, v^i);
                v^= buf[i];
        }
        for (v = i = n; --i>= 0;) {
                buf[i] += tbox(t2box, v^i);
                v^= buf[i];
        }
        for (i = 0; i <n; ++i) {
                buf[i]^=tbox(t1box, i + 1);
        }
        for (v = i = n; --i >= 0;) {
                t = tbox(t2box, v^i);
                v^=buf[i];
                buf[i]-=t;
```

*FIG. 3* t1.h

0xbc, 0xa6, 0x39, 0xd5, 0x02, 0xd2, 0x81, 0xce,
0xf9, 0x38, 0x9d, 0x0a, 0x09, 0xc3, 0x94, 0xf6,
0xe9, 0x92, 0xda, 0xbe, 0x1b, 0x2f, 0x89, 0x3c,
0x48, 0x96, 0x3e, 0x4a, 0xfc, 0xfe, 0xe3, 0x0e,
0xb3, 0x50, 0x7a, 0xc9, 0x40, 0xff, 0x2c, 0xba,
0x47, 0x2e, 0x30, 0x9e, 0x12, 0xa9, 0xa1, 0xd8,
0xb5, 0xa8, 0x1d, 0x04, 0x33, 0xb0, 0xef, 0x95,
0xa3, 0xed, 0x32, 0x59, 0x68, 0x2b, 0xe1, 0xf3,
0x2a, 0xb8, 0x1c, 0x21, 0x13, 0xb2, 0x60, 0x66,
0x9c, 0x74, 0x5b, 0xb1, 0x18, 0xec, 0x77, 0xd0,
0x1f, 0xc2, 0x3f, 0xf8, 0x1e, 0x93, 0xae, 0x8c,
0x23, 0xc6, 0x3d, 0x5e, 0xe7, 0x15, 0xc1, 0x62,
0xa7, 0x8f, 0xdd, 0x90, 0xf1, 0xb4, 0x34, 0x3a,
0x2d, 0xf4, 0xe8, 0xcf, 0x53, 0xfa, 0x25, 0x69,
0x7b, 0x36, 0xad, 0x9a, 0x7c, 0x58, 0x05, 0x9b,
0xf7, 0x49, 0xa2, 0x7f, 0xdc, 0xf5, 0xcb, 0xd6,
0xdb, 0x8a, 0xc5, 0x20, 0x27, 0xd7, 0x8b, 0x14,
0xd9, 0x16, 0xc0, 0x28, 0xaa, 0x57, 0x78, 0x0d,
0x26, 0x7e, 0x87, 0x4c, 0x24, 0xeb, 0x99, 0x4e,
0x64, 0x71, 0x6f, 0xe4, 0x84, 0x46, 0xb7, 0x17,
0x76, 0x88, 0xbb, 0xe0, 0x3b, 0xca, 0x8e, 0x83,
0x5a, 0x43, 0x4d, 0xa5, 0x6c, 0x6a, 0x63, 0x82,
0xac, 0x0c, 0xfd, 0xab, 0x9f, 0x1a, 0x55, 0x41,
0x80, 0x22, 0x00, 0xc8, 0x65, 0x08, 0x73, 0x6b,
0xcc, 0x67, 0x56, 0xdf, 0x85, 0x42, 0x5f, 0xe2,
0xbd, 0x91, 0x44, 0x07, 0x86, 0x7d, 0x75, 0xb9,
0xb6, 0xe6, 0x4b, 0xc7, 0x61, 0xee, 0xf0, 0xf2,
0xa0, 0xaf, 0x31, 0x06, 0xfb, 0x10, 0x72, 0x4f,
0x97, 0xe5, 0xbf, 0x5d, 0xd1, 0xde, 0xc4, 0x5c,
0xcd, 0x37, 0xea, 0x11, 0x79, 0x6e, 0x54, 0x0b,
0x45, 0xa4, 0x8d, 0x01, 0x03, 0x51, 0x35, 0x70,
0x52, 0x98, 0xd4, 0x19, 0x6d, 0xd3, 0x0f, 0x29,

*FIG. 4* t2.h

0xde, 0x75, 0xe3, 0x3e, 0x66, 0x2c, 0xfc, 0x77,
0x43, 0x81, 0xdb, 0x10, 0xa3, 0x9a, 0xcd, 0x7e,
0x8d, 0x7b, 0x64, 0x6e, 0x52, 0x0c, 0x15, 0x23,
0x95, 0x65, 0xd1, 0xb4, 0x5d, 0x73, 0x63, 0xac,
0x59, 0xd0, 0xc3, 0xf6, 0xf3, 0xaf, 0x61, 0x89,
0x53, 0x5b, 0x79, 0x83, 0x9f, 0x08, 0x0e, 0xa4,
0xd6, 0x1c, 0xe4, 0x93, 0x3f, 0xe9, 0x44, 0xad,
0xa9, 0x01, 0x99, 0x6c, 0xea, 0xc6, 0x49, 0x92,
0xff, 0x58, 0xbb, 0x28, 0x19, 0xdd, 0xa0, 0xbc,
0xe6, 0x0d, 0xca, 0x88, 0x25, 0x06, 0xd8, 0x2b,
0xbd, 0xba, 0x17, 0xcf, 0xc7, 0xd2, 0xd9, 0x46,
0x60, 0x7f, 0xe8, 0x48, 0xd3, 0x4b, 0x7c, 0x0b,
0xbe, 0xa6, 0xc5, 0xb6, 0x70, 0x5a, 0x7d, 0x37,
0x8c, 0x34, 0x9c, 0x6d, 0x39, 0x21, 0x3b, 0x1d,
0xcb, 0x09, 0x24, 0x1a, 0x5e, 0x1e, 0x14, 0xb2,
0x7a, 0x0a, 0x4a, 0x85, 0xb1, 0x8b, 0x4e, 0x4f,
0xd7, 0xf5, 0xda, 0x6b, 0x87, 0x96, 0x55, 0x32,
0x3a, 0xb9, 0x47, 0x3c, 0x71, 0xdc, 0x74, 0xb5,
0xed, 0xfd, 0x62, 0x80, 0x03, 0x2e, 0x98, 0xc8,
0xa2, 0x90, 0x67, 0x84, 0xab, 0xf1, 0xa7, 0xee,
0xe7, 0x50, 0xf8, 0xd5, 0x45, 0xae, 0x00, 0x9e,
0x07, 0x5f, 0x22, 0xf7, 0xc2, 0x4d, 0x8f, 0x4c,
0x82, 0x57, 0x68, 0xc9, 0x04, 0xfe, 0x11, 0xfa,
0x91, 0x31, 0x13, 0xef, 0x8e, 0x12, 0x94, 0xf2,
0x38, 0xec, 0x30, 0x16, 0x76, 0x2a, 0xe0, 0x29,
0x9b, 0xf4, 0xf9, 0x33, 0x6a, 0x78, 0xbf, 0x69,
0x51, 0xe2, 0xe5, 0x41, 0xb7, 0xeb, 0x26, 0xb0,
0x1f, 0x35, 0x6f, 0xa8, 0x9d, 0x3d, 0xaa, 0xb8,
0xc1, 0x27, 0x18, 0xdf, 0xe1, 0x42, 0x54, 0xcc,
0x1b, 0x72, 0x2d, 0xa1, 0xc4, 0x05, 0x40, 0x5c,
0xb3, 0xa5, 0x97, 0xc0, 0x36, 0x20, 0x02, 0x2f,
0xce, 0xf0, 0x0f, 0xd4, 0x8a, 0x56, 0xfb, 0x86,

*FIG. 5*

METHOD AND APPARATUS FOR ENCRYPTING DATA IN A WIRELESS COMMUNICATION SYSTEM

CROSS-REFERENCE TO RELATED APPLICATIONS

This application is a continuation of U.S. patent application Ser. No. 10/081,750, filed Feb. 21, 2002, now abandoned, which is a continuation of Ser. No. 09/369,382 filed Aug. 5, 1999 U.S. Pat. No. 6,385,316, issued May 7, 2002, which is a continuation of Ser. No. 08/815,347 filed Mar. 11, 1997 U.S. Pat. No. 6,075,859, issued Jun. 13, 2000, all assigned to the assignee hereof and hereby expressly incorporated herein.

BACKGROUND OF THE INVENTION

I. Field of the Invention

The present invention relates to communications systems. More particularly, the present invention relates to a novel and improved method for encrypting data for security in wireless communication systems.

II. Description of the Related Art

In a wireless communication system, it is desirable for the service provider to be able to verify that a request for service from a remote station is from a valid user. In some current cellular telephone systems, such as those deploying the AMPS analog technology, no provision is made to deter unauthorized access to the system. Consequently, fraud is rampant in these systems. One fraudulent means for obtaining service is known as cloning, in which an unauthorized user intercepts the information necessary to initiate a call. Subsequently, the unauthorized user can program a mobile telephone using the intercepted information and use that telephone to fraudulently receive telephone service.

To overcome these and other difficulties, many cellular telephone systems have implemented authentication schemes such as that standardized by the Telecommunications Industry Association (TIA) in EIA/TIA/IS-54-B. One facet of this authentication scheme is encryption of information, transmitted over the air, that is required to receive service. This information is encrypted using the Cellular Message Encryption Algorithm (CMEA). The CMEA algorithm is disclosed in U.S. Pat. No. 5,159,634, entitled "CRYPTOSYSTEM FOR CELLULAR TELEPHONY", incorporated by reference herein.

Several major weaknesses have been discovered in CMEA which allow encrypted information to be deciphered using current standard computational equipment in a relatively short period of time. These weaknesses will be thoroughly outlined hereinafter followed by a description of the present invention which overcomes these weaknesses. CMEA has been published on the Internet, hence these weaknesses are open for discovery by anyone with an interest in doing so. Thus, a new algorithm for encryption is desirable to replace CMEA to avoid the interception and fraudulent use of authentication information necessary to initiate cellular service.

SUMMARY OF THE INVENTION

The present invention is a novel and improved method for data encryption. The present invention is referred to herein as Block Encryption Variable Length (BEVL) encoding, which overcomes the identified weaknesses of the CMEA algorithm. The preferred embodiment of the present invention has the following properties:

Encrypts variable length blocks, preferably at least two bytes in length;
Self-inverting;
Uses very little dynamic memory, and only 512 bytes of static tables;
Efficient to evaluate on 8-bit microprocessors; and
Uses a 64 bit key, which can be simply modified to use a longer or shorter key.

The first weakness identified in CMEA is that the CAVE (Cellular Authentication Voice Privacy and Encryption) table used for table lookups is incomplete. It yields only 164 distinct values instead of 256. The existence of a large number of impossible values makes it possible to guess return values of tbox( ) or key bytes, and verify the guesses. This first weakness is mitigated in the present invention by replacing the CAVE table with two different tables chosen to eliminate the exploitable statistical characteristics of the CAVE table. These tables, called t1box and t2box, are strict permutations of the 256 8-bit integers, where no entry appears at its own index position. In addition, t1box[i] does not equal t2box[i], for all values of i. These two tables were randomly generated with candidates being discarded which did not meet the above criteria.

The second weakness of CMEA is the repeated use of the value of a function called tbox( ), evaluated at zero. The value tbox(0) is used twice in the encryption of the first byte. This makes it possible to guess tbox(0) and use the guess in determining other information about the ciphering process, notably the result of the first step of CMEA for the last byte, and the arguments of the two values of tbox( ) used in encrypting the second byte. It also makes it possible, through a chosen-plaintext attack, to determine tbox( ) by trying various plaintext values until a recognized pattern appears in the ciphertext. This second weakness is mitigated by changing the self-inverting procedures used in CMEA to a preferred set of procedures providing better mixing. This is done by introducing a second pass using a different table (t2box). In this situation there are two values of tbox( ) derived from different tables with equal significance which serve to mask each other.

A related weakness in CMEA is that information gathered from analyzing texts of different lengths can generally be combined. The use of the second critical tbox( ) entry in BEVL depends on the length of the message and makes combining the analysis of different length texts less feasible.

A third weakness discovered in CMEA is incomplete mixing of upper buffer entries. The last n/2 bytes of the plaintext are encrypted by simply adding one tbox( ) value and then subtracting another value, the intermediate step affecting only the first half of the bytes. The difference between ciphertext and plaintext is the difference between the two values of tbox( ). BEVL addresses this third weakness by performing five passes over the data instead of three. The mixing, performed by CMEA only in the middle pass, is done in the second and fourth passes which mix data from the end of the buffer back toward the front. The middle pass of CMEA also guarantees alteration of at least some of the bytes to ensure that the third pass does not decrypt. In an improved manner, BEVL achieves this goal in the middle pass by making a key dependent transformation of the buffer in such a way that at most a single byte remains unchanged.

CMEA's fourth weakness is a lack of encryption of the least significant bit (LSB) of the first byte. The repeated use of tbox(0) and the fixed inversion of the LSB in the second step of CMEA results in the LSB of the first byte of ciphertext being simply the inverse of the LSB of the first byte of plaintext. BEVL avoids this fourth weakness through a key dependent alteration of the buffer during the middle pass which makes the LSB of the first byte unpredictable on buffers of two bytes or more in length.

A fifth weakness of CMEA is that the effective key size is 60 rather than 64 bits. As such, each key is equivalent to 15 others. BEVL increases the number of table lookups while decreasing the number of arithmetic operations, ensuring that all 64 bits of the key are significant.

Finally, CMEA's tbox( ) function can be efficiently compromised by a meet-in-the-middle attack. Once four tbox( ) values are derived, the meet-in-the-middle attack can be accomplished with space and time requirements on the order of 2^30, independent of the composition of the CAVE table. BEVL addresses this in a number of ways. The construction of the tbox( ) function recovers two unused bits of the key. The repetition of the combination with the least 8 bits of the encryption key at both the beginning and end of tbox( ) means that the minimum computation and space should be increased by eight bits. Since there are two sides of each table, and two different tables, the minimum complexity should be increased by another two bits, leading to a minimum space and time requirement on the order of 2^42. Further, the meet-in-the-middle attack on CMEA requires the recovery of at least some of the tbox( ) entries. This is made more difficult using BEVL, which requires simultaneous attacks on two separate sets of tbox( ) values, which tend to disguise each other.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a "C" program implementing the exemplary embodiment of the method of encrypting a block of characters in the present invention;

FIG. 4 is an exemplary embodiment of t1box; and

FIG. 5 is an exemplary embodiment of t2box.

DETAILED DESCRIPTION OF THE PREFERRED EMBODIMENTS

Figure 1:
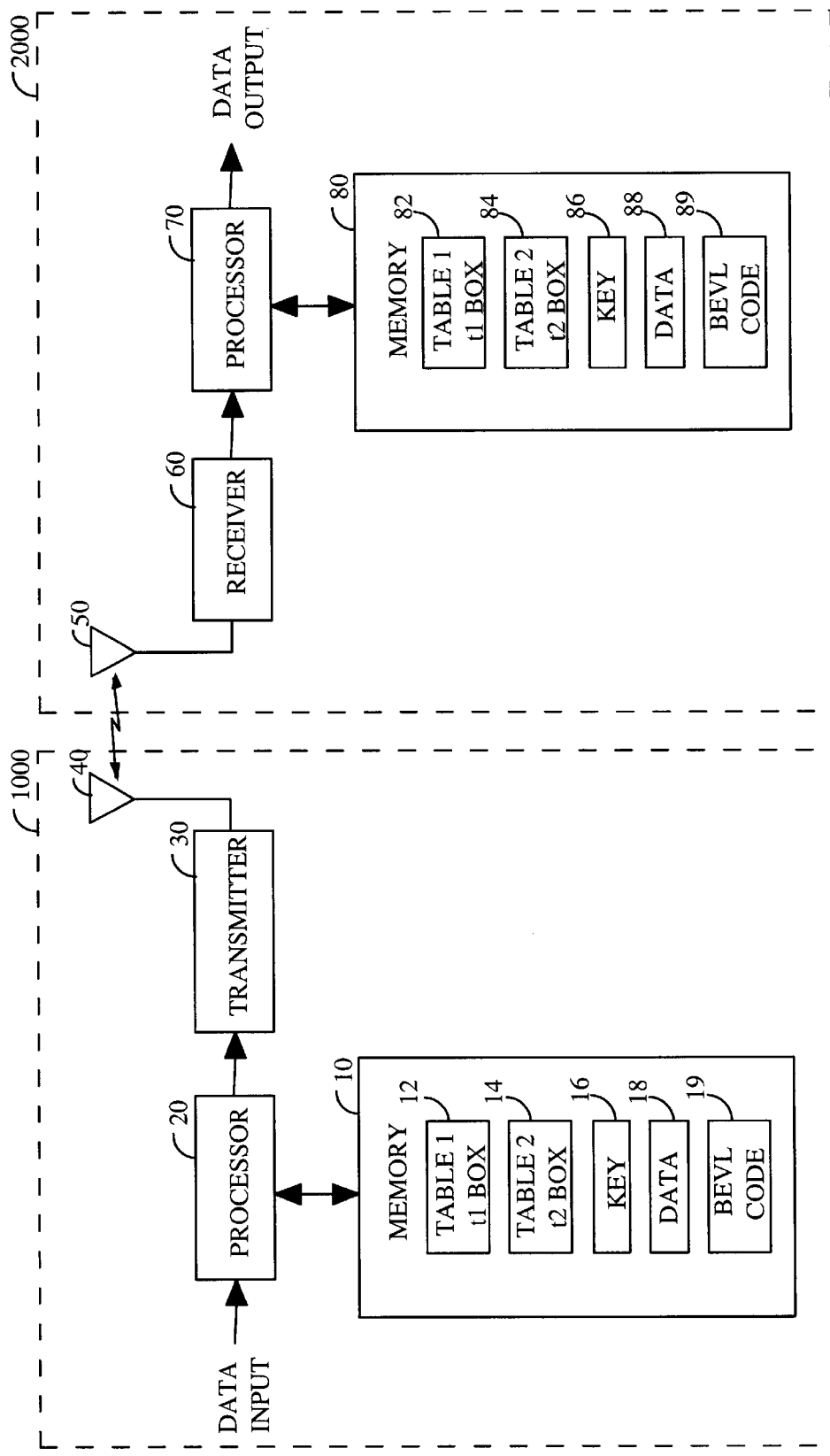
FIG. 1 is a block diagram illustrating the encryption system of the present invention.

The exemplary embodiment of the present invention consists of a first station 1000 encrypting data for wireless transmission to a second receiving station 2000, as depicted in FIG. 1. First station 1000 can be a remote station transmitting to a second station 2000, which could be a base station. Alternatively, first station 1000 could be a base station transmitting to a second station 2000, which could be a remote station. In all likelihood, both remote and base stations will have encryption and decryption means, as well as transmission and reception means, but the simplified system shown in FIG. 1 shows clearly the elements required to enable the present invention. Further, the benefits of this invention are not limited to wireless communications but can be readily applied in any situation where secure data must be transmitted over a medium which is susceptible to interception, as will be well understood by those skilled in the relevant art.

In FIG. 1, memory 10 containing the necessary data for encryption according to the BEVL algorithm of the present invention is connected with processor 20. In the exemplary embodiment, processor 20 is a relatively simple 8-bit microprocessor, capable of executing instructions stored in BEVL code 19. Processor 20 contains an arithmetic logic unit (ALU, not shown) capable of performing simple 8-bit instructions such as bitwise exclusive OR (referred to simply as XOR or denoted ≈ hereinafter), integer addition and subtraction, and the like. Processor 20 is also capable of general program flow instructions and the ability to load and store values from a memory, such as memory 10. Those skilled in the art will recognize that these requirements are quite minimal, making the present invention quite suitable to applications where size and/or cost requirements make simple microprocessors desirable, such as in portable devices. Clearly the present invention can easily be implemented using more powerful microprocessors as well.

Memory 10 contains tables t1box 12 and t2box 14, an encryption key 16, and the code to be executed (BEVL code) 19. Data to be encrypted is input to processor 20, which stores that data in memory 10 in a location referred to as data 18. Although FIG. 1 depicts all these elements in a single memory, it is understood that a plurality of memory devices could be used. In the preferred embodiment, the tables 12 and 14 as well as BEVL code 19 are stored in non-volatile memory such as EEPROM or FLASH memory. These portions of the memory need not be writeable.

Encryption key 16 can be generated by a number of means that are well known in the art. A simple embodiment may have key 16 in non-volatile memory that is programmed once at the time the station is activated for service. In the exemplary embodiment, key 16 is generated and changed according to the protocol as set forth in the aforementioned EIA/TIA/IS-54-B.

The data to be encrypted, data 18, is stored in random access memory (RAM). The encryption will be performed "in place", which means the memory locations holding the unencrypted data at the beginning of procedure will also hold the intermediate values as well as the final encrypted data.

Data 18 is encrypted in processor 20 according to BEVL code 19, utilizing t1box 12, t2box 14, and encryption key 16. A description of the encryption process is detailed hereinafter.

Encrypted data 18 is delivered by processor 20 to transmitter 30 where it is modulated, amplified and upconverted for transmission on antenna 40.

Antenna 50 receives the data and passes it to receiver 60 where the data is downconverted, amplified, demodulated, and delivered to processor 70. In the exemplary embodiment, the format for the wireless communication between the two stations depicted in FIG. 1 is described in "Mobile Station-Base Station Compatibility Standard for Dual-Mode Wide Band Spread Spectrum Cellular System", TIA/EIA/IS-95-A. The use of CDMA techniques in a multiple access communication system such as a wireless telephone system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention, and incorporated by reference herein.

Processor 70, which has the same requirements as processor 20, is coupled to memory 80. Memory 80 is comprised of memories 82, 84, 86, 88, and 89 which are analogous to memories 12, 14, 16, 18, and 19, respectively. Processor 70 stores the encrypted data in data memory 88. Key 86 is determined in like fashion to key 16, described previously. Tables 82 and 84 are identical to tables 12 and 14. Since the data processing in this invention is self-inverting, BEVL code 89, identical to BEVL code 19, is executed in processor 70 in conjunction with t1box 82, t2box 84, and key 86 on encrypted data 88, just as was done in the encryption process of data 18. As before, the data processing is performed "in place", and the result in data 88 will be the decrypted data. Processor 70 retrieves the decrypted data from memory 80 and delivers it for subsequent use through the data output. In the exemplary embodiment, the resultant data will be used in authentication procedures as disclosed in EIA/TIA/IS-54-B.

Figure 2A:
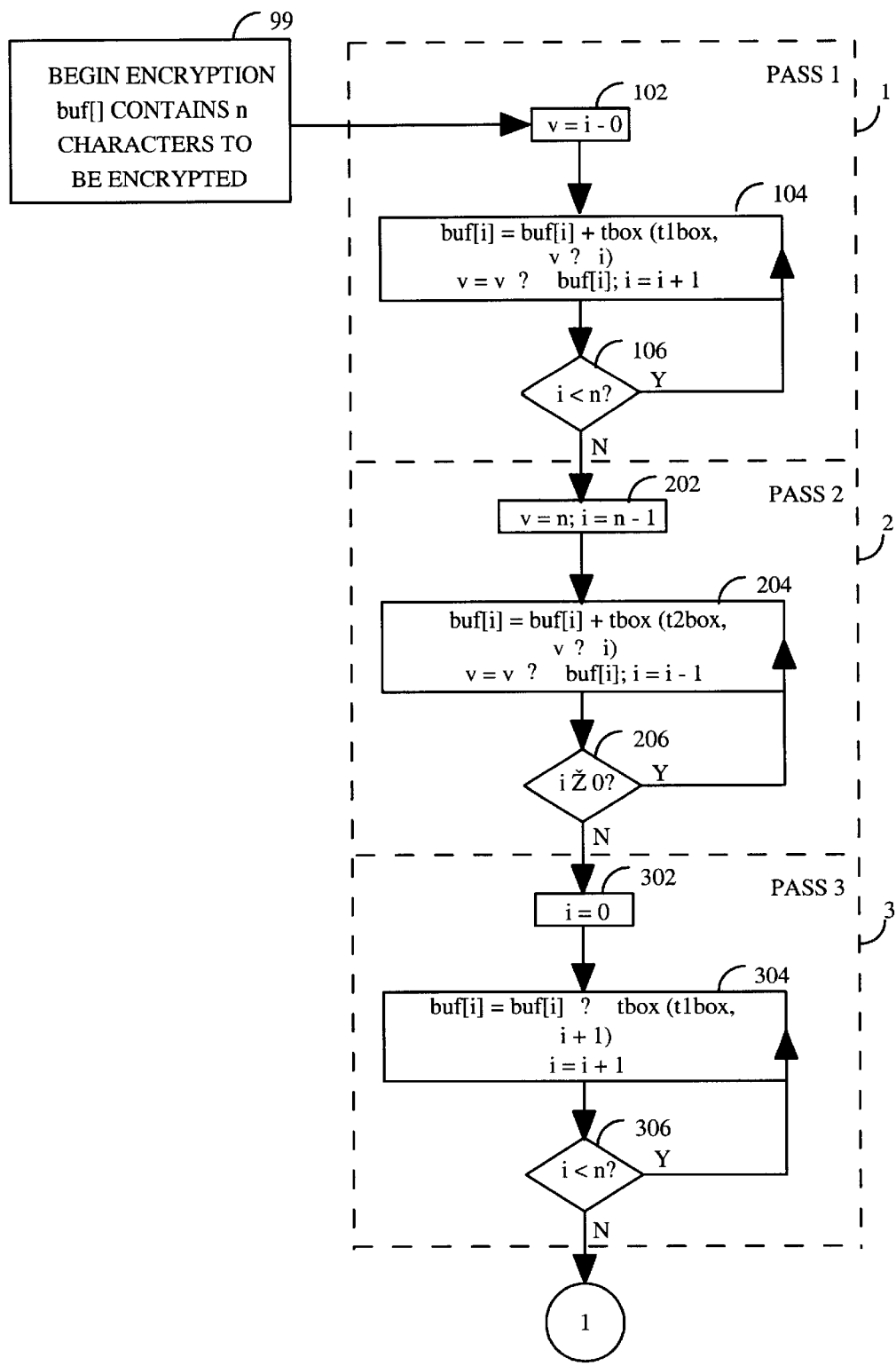
FIG. 2 is a flow diagram of an exemplary embodiment of the method of encrypting a block of characters in the present invention.
Figure 2B:
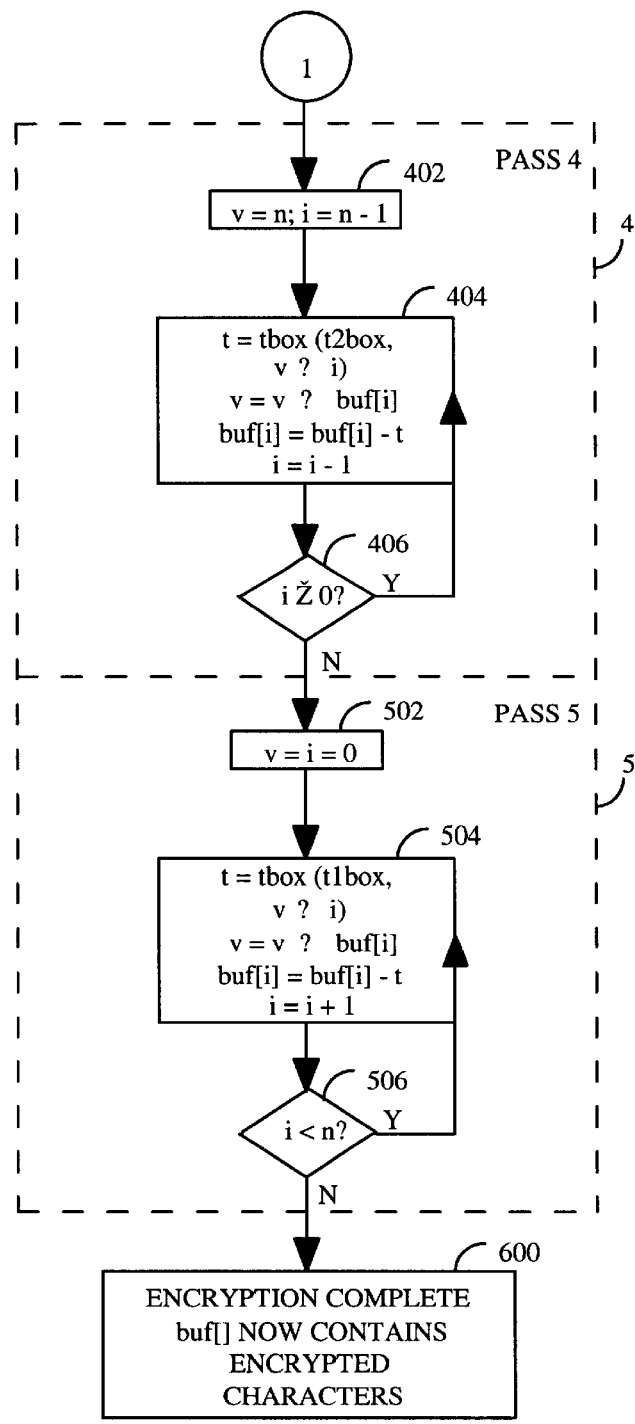
Figure 2A:
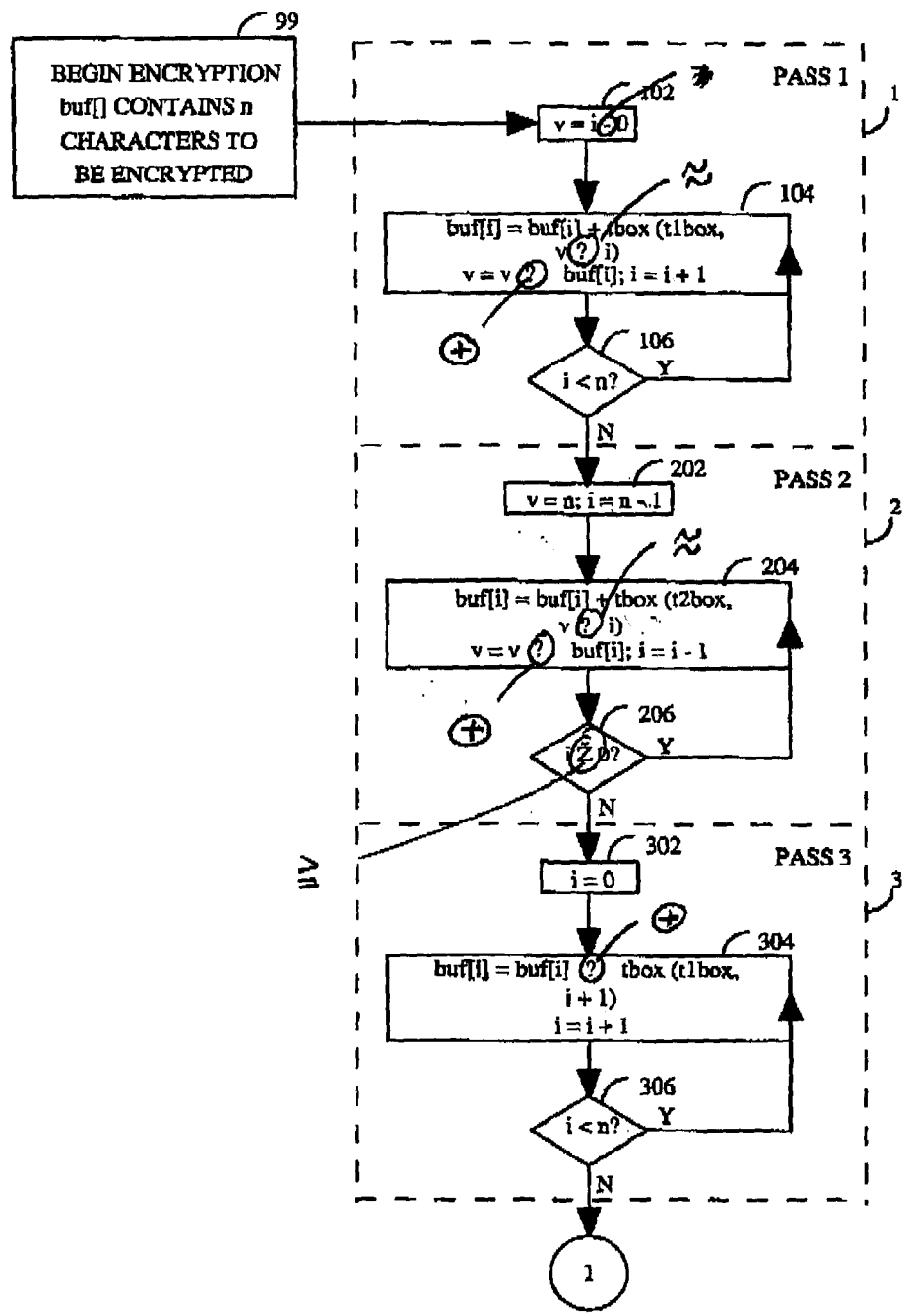

FIG. 2 illustrates a flow chart of the method used by processors 20 and 70 in conjunction with previously described memory elements 10 and 80, respectively. As mentioned previously, the encryption process is self-inverting, meaning the decryption process is the same as the encryption process. Hence, only the encryption process will be described in detail. The decryption process will be obvious by substituting the encrypting blocks of FIG. 1 with the analogous decrypting blocks of FIG. 1 as set forth previously.

Block 99 marks the beginning of the encryption process. An array of characters named buf[] is used to describe the characters to be encrypted as stored in data memory 18. The variable n denotes the length of the message to be encrypted in terms of number of characters. As stated previously, one of the improvements present in the BEVL process is the five pass encryption that takes place. Each of the five passes has been blocked out in dashed lines and labeled 1–5 to make them easy to distinguish. Each pass has notable similarities and differences. Passes 1, 3, and 5 use the table t1box 12 and work from the beginning of the buffer towards the end. Passes 2 and 4 use the table t2box 14 and work from the end of the buffer until the beginning is reached. BEVL's self-inverting property comes from the fact that pass 3 is self-inverting, while pass 1 is the inverse of pass 5 and pass 2 is the inverse of pass 4.

In the preferred embodiment of the present invention, the passes are made in opposite directions. In alternative embodiments, passes could progress in the same direction, with alternating passes using the same or different tables (re-using the same table in multiple passes does make the encryption more robust, but not as robust as when different tables are used). Inserting additional passes is another alternative which can be used in combination with either approach. In the situation where passes are made in the same direction, modifications to the first buffer entry are more predictable, with predictability decreasing in modifications further down the buffer. When alternating opposite pass directions are used, the modification to the first byte in the buffer is fairly predictable. However, the modification to that byte in the second pass depends on all the bytes in the buffer, making it much less predictable. In similar fashion, the modification to the last byte in the buffer depends on all the bytes in the buffer during the first pass, while a more predictable change is made in the second. Since the predictability of change is distributed more evenly using passes in opposite directions, doing so is much preferable to using multiple passes in the same direction. Note that pass 3 doesn't really have a direction, since the change made would be identical either way.

In each pass, a function tbox( ) is used. It is in this function that key 16 is incorporated. The parameters passed to function tbox( ) consist of a 256 byte table which will either be passed t1box 12 or t2box 14, and an index labeled tv. In the exemplary embodiment, tbox( ) is defined as:

$$tbox(B,tv)=B[B[B[B[B[B[B[B[tv\approx k0]+k1]\approx k2]+k3]\approx k4]+k5]\approx k6]+k7]\approx k0], \quad (1)$$

where k0 through k7 denote eight 8-bit segments which when concatenated form the 64-bit key 16;

B[x] is the xth 8-bit element of an array B;

$\approx$ denotes the bit-wise exclusive OR operation; and

+ represents modulo 256 addition.

In an alternative embodiment, where a key of a certain length provides encryption that is considered too strong, the key strength can be artificially limited without changing the length of the key by altering the tbox( ) function. For example, a 64 bit key can be artificially limited to 40 bits by using the 64 bit key in such a manner that it is in an equivalence class of 2^24 others while still ensuring that any single bit change to the key will produce a different result. The following definition of tbox( ) exhibits the recommended variation to render a 64 bit key effectively a 40 bit key:

$$tbox(B,tv)=B[B[B[B[B[B[B[B[tv\approx k0]+k1]\approx (k2\approx k3)]+(k2\approx k3)]\\ \approx (k4\approx k5)]+(k4\approx k5)]\approx (k6\approx k7)]+(k6\approx k7)]\approx k0], \quad (2)$$

where k0 through k7 denote eight 8-bit segments which when concatenated form the 64-bit key 16;

B[x] is the xth 8-bit element of an array B;

$\approx$ denotes the bit-wise exclusive OR operation; and

+ represents modulo 256 addition.

The tbox( ) function is designed such that each of the intermediate operations are permutations, meaning each input has a one-to-one mapping to an output. In the exemplary embodiment, the operations used are modulo 256 addition and logical exclusive OR. If the input value passed to tbox( ) is a permutation, and the table lookup is as well, the use of these functions guarantees that the output of tbox( ) will also be a one-to-one function. In other words, the tbox( ) function as a whole is guaranteed to be a permutation if the table passed to it also is. This is not the case for CMEA, where the steps in the tbox( ) function are not one-to-one. Therefore, in CMEA, even if the CAVE table, which is not a permutation, were to be replaced with a table which is a permutation, the output of tbox( ) still would not be a permutation. Conversely for BEVL, any choice of one-to-one functions for combining key material to generate the final permutation would be acceptable. The exemplary embodiment is one such method. Alternative methods can easily be substituted by those skilled in the art which still conform to this permutation principle of the present invention. Intermediate functions which do not preserve the one-to-one nature of the output can alternatively be employed in the BEVL tbox( ) function, but the results would be sub-optimal.

A further improvement included in the definition of tbox( ) is that some of the key bits are used both at the beginning and at the end. In the exemplary embodiment key byte k0 is used, but alternative embodiments can employ any of the key bits and accomplish the same improvement. The use of the same value defeats the meet-in-the-middle attack. Failing to reuse at least some of the key information at both the beginning and end allows a straightforward, albeit computationally complex, derivation of the key from a small number of values of the tbox( ) function. With this reuse, tables used in efforts to attack the encryption require much more space and computations required to find a solution are much more extensive.

The exemplary embodiment of BEVL details the use of the tbox( ) function in conjunction with the two tables t1box and t2box The resultant outputs are key-dependent permutations of the possible inputs. However, since the values of the function depend only on the key, not on the data, the function can alternatively be pre-computed for the 256 possible inputs and two possible tables with the results stored in memory. Thus a table look up can replace the reevaluation of the function. Those skilled in the art will recognize that these two methods are functionally equivalent, and will be able to make the time versus space tradeoff when employing an embodiment of the present invention. An equivalent alternative is to start with tables initialized with a permutation of the 256 possible inputs, and perform a key-dependent shuffling of those tables when the key is initialized. Then, during subsequent encryption, a table index operation would be used instead of the current calls to tbox( ), with equal effect.

The tables t1box and t2box are strict permutations, where no entry in the table is equal to its index. This strictness guarantees that there exists no key which is weaker than any other key by allowing an intermediate value in a tbox( ) computation to remain unchanged. The fact that the tables are permutations is important, as described previously in reference to function tbox( ). If the tables were not permutations, then after the table lookup in the tbox( ) function, there would be some values which could not be the result. These impossible values would allow guesses for return values from tbox( ) and parts of the key to be eliminated, reducing the work to guess the 64 bit key significantly. Alternative embodiments could employ tables which are not permutations, but the encryption would be sub-optimal.

Any form of cryptanalysis of CMEA must begin by deriving values of the tbox( ) function. A complete analysis, where all outputs for the 256 possible inputs are known, allows CMEA to be applied even without knowing the initial key. However, recovery of the key is possible knowing as few as four distinct values of the function. Thus BEVL places emphasis on disguising the outputs from tbox( ) with other outputs, particularly the value of tbox(0). A number of alternatives are envisioned to accomplish this disguise. The preferred embodiment uses a second different table, t2box, and an added pair of passes each which are performed in opposite directions. Any of these three modifications, or sub-combinations thereof, would address the problem to some extent. However, the combination of all three provides the most security.

In the preferred embodiment, the forward and backward passes use different tables, t1box and t2box, in conjunction with the tbox( ) function. This is done so that cryptanalysis would require discovery of two complementary sets of function values, rather than just one set. Since the passes tend to disguise each other, two tables provide the best security. Alternative embodiments are envisioned which employ only a single table. While these methods are still secure, they are less secure than those where two tables are employed.

Begin pass 1 by proceeding from block 99 to block 102, where variable v and buffer index i are initialized to zero. Then, in block 104, each character buf[i] is modified by adding to itself the result of function call tbox(t1box, v≈i). The variable v is subsequently updated by XORing itself with the new value of buf[i]. The buffer index i is then incremented. In block 106, if i<n, the pass is not complete and flow returns to block 104. When all characters have been modified according to block 104, i will equal n and pass 1 will be complete. Note that the characters were modified beginning with buf[0] working towards the end, buf[n−1].

Begin pass 2 by proceeding from block 106 to block 202, where variable v is initialized to the value n and buffer index i is initialized to the value n−1. Then, in block 204, each character buf[i] is modified by adding to itself the result of function call tbox(t2box, v≈i). The variable v is subsequently updated by XORing itself with the new value of buf[i]. The buffer index i is then decremented. In block 206, if i≧0, the pass is not complete and the flow returns to block 204. When all characters have been modified according to block 204, i will equal −1 and pass 2 will be complete. Note that, unlike pass 1, the characters were modified beginning with buf[n−1] working towards the beginning, buf[0], and the table t2box 14 was used instead of table t1box 12.

Pass 3 begins in block 302. Buffer index i is initialized to zero. Variable v is not used in this pass. Then, in block 304, each character buf[i] is modified by XORing with itself the result of function call tbox(t1box, i+1). The buffer index i is then incremented. In block 306, if i<n, the pass is not complete and the flow returns to block 304. When all characters have been modified according to block 304, i will equal n and pass 3 will be complete. Note that, like in pass 1, the characters were modified beginning with buf[0] working towards the end, buf[n−1], and table t1box 12 was used. As stated before, however, the direction of pass 3 is not important, since the identical result is achieved with either direction.

In pass 3, a different output from tbox( ) is combined with each buf[ ] entry. Because the outputs from tbox( ) form a permutation, at most only one such value can possibly be zero. Whether or not there will be a zero depends on the key. In BEVL, the change in the buffer is key-dependent and very difficult to predict. On average, the chance that one of the values will be zero is n/256, where n is the length of the buffer. Any self-inverting key-dependent or data-dependent change which guarantees that the values in the buffer will be altered is sufficient to ensure encryption. This is an important improvement for BEVL, since, in CMEA, values which remain unchanged lead to cases where the algorithm fails to encrypt at all.

Begin pass 4 by proceeding from block 306 to block 402, where variable v is initialized to n and buffer index i is initialized to the value n−1. Then, in block 404, a temporary variable t is assigned the value returned by the function call tbox(t2box, v≈i). The variable v is subsequently updated by XORing itself with the current value of buf[i]. Each character buf[i] is then modified by subtracting from itself the value of temporary variable t. The buffer index i is then decremented. In block 406, if i≧0, the pass is not complete and the flow returns to block 404. When all characters have been modified according to block 404, i will equal −1 and pass 4 will be complete. Note that, like in pass 2, the characters were modified beginning with buf[n−1] working towards the beginning, buf[0], and table t2box 14 was used.

Begin pass 5 by proceeding from block 406 to block 502, where variable v and buffer index i are initialized to the value zero. Then, in block 504, a temporary variable t is assigned the value returned by the function call tbox(t1box, v≈i). The variable v is subsequently updated by XORing itself with the current value of buf[i]. Each character buf[i]

is then modified by subtracting from itself the value of temporary variable t. The buffer index i is then incremented. In block 506, if i<n, the pass is not complete and the flow returns to block 504. When all characters have been modified according to block 504, i will equal n and pass 5 will be complete. Note that, like in passes 1 and 3, the characters were modified beginning with buf[n−1] working towards the beginning, buf[0], and table t1box 12 was used.

Proceed now to block 600. Encryption is now complete. Buf[] now contains the encrypted characters for secure transmission.

A "C" program implementing the operation described above is provided in FIG. 3. Table t1box 12 is provided in "C" in FIG. 4. Table t2box 14 is provided in "C" in FIG. 5.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for mitigating a weakness in the Cellular Message Encryption Algorithm (CMEA), the weakness being an exploitable statistical characteristic of using a Cellular Authentication and Voice Encryption algorithm (CAVE) table in a substitution box, the method comprising:

generating a first permutation table;

generating a second permutation table; and using the first permutation table and the second permutation table in the substitution box of the CMEA to generate a first substitution value and a second substitution value, wherein the first substitution value and the second substitution value are permutations of equal significance.

2. The method of claim 1, wherein using the first permutation table and the second permutation table in the substitution box of the CMEA to generate a first substitution value and a second substitution value comprises:

using the first permutation table in the substitution box during a forward pass of the CMEA.

3. The method of claim 1, wherein using the first permutation table and the second permutation table in the substitution box of the CMEA to generate a first substitution value and a second substitution value comprises:

using the first permutation table in the substitution box during a backward pass of the CMEA.

4. The method of claim 1, wherein using the first permutation table and the second permutation table in the substitution box of the CMEA to generate a first substitution value and a second substitution value comprises:

using the second permutation table in the substitution box during a forward pass of the CMEA.

5. The method of claim 1, wherein using the first permutation table and the second permutation table in the substitution box of the CMEA to generate a first substitution value and a second substitution value comprises:

using the second permutation table in the substitution box during a backward pass of the CMEA.

6. A method for mitigating a weakness in the Cellular Message Encryption Algorithm (CMEA), the weakness being an exploitable statistical characteristic of using a Cellular Authentication and Voice Encryption algorithm (CAVE) table in a substitution box, the method comprising:

using a first permutation table in the substitution box of the CMEA to generate a first substitution value; and using a second permutation table in the substitution box of the CMEA to generate a second substitution value, wherein the first substitution value and the second substitution value are permutations of equal significance.

7. The method of claim 6, wherein using the first permutation table in the substitution box of the CMEA to generate a first substitution value comprises:

using the first permutation table in the substitution box during a forward pass of the CMEA.

8. The method of claim 6, wherein using the first permutation table in the substitution box of the CMEA to generate a first substitution value comprises:

using the first permutation table in the substitution box during a backward pass of the CMEA.

9. The method of claim 6, wherein using the second permutation table in the substitution box of the CMEA to generate a second substitution value comprises:

using the second permutation table in the substitution box during a forward pass of the CMEA.

10. The method of claim 6, wherein using the second permutation table in the substitution box of the CMEA to generate a second substitution value comprises:

using the second permutation table in the substitution box during a backward pass of the CMEA.

11. Apparatus for performing the Cellular Message Encryption Algorithm (CMEA), comprising:

memory for storing a first permutation table and a second permutation table and instructions for performing the CMEA; and processor for performing the CMEA using the first permutation table and the second permutation table in the substitution box of the CMEA to generate a first substitution value and a second substitution value, wherein the first substitution value and the second substitution value are permutations of equal significance.

12. The apparatus of claim 11, wherein the processor uses the first permutation table in the substitution box during a forward pass of the CMEA.

13. The apparatus of claim 11, wherein the processor uses the first permutation table in the substitution box during a backward pass of the CMEA.

14. The apparatus of claim 11, wherein the processor uses the second permutation table in the substitution box during a forward pass of the CMEA.

15. The apparatus of claim 11, wherein the processor uses the second permutation table in the substitution box during a backward pass of the CMEA.

16. Memory storing instructions for mitigating a weakness in the Cellular Message Encryption Algorithm (CMEA), the weakness being an exploitable statistical characteristic of using a Cellular Authentication and Voice Encryption algorithm (CAVE) table in a substitution box, the memory comprising:

instructions for using a first permutation table in the substitution box of the CMEA to generate a first substitution value; and instructions for using a second permutation table in the substitution box of the CMEA to generate a second substitution value, wherein the first substitution value and the second substitution value are permutations of equal significance.

17. The memory of claim 16, wherein the instructions for using the first permutation table in the substitution box of the CMEA to generate a first substitution value comprises:

instructions for using the first permutation table in the substitution box during a forward pass of the CMEA.

18. The memory of claim 16, wherein the instructions for using the first permutation table in the substitution box of the CMEA to generate a first substitution value comprises:

instructions for using the first permutation table in the substitution box during a backward pass of the CMEA.

19. The memory of claim 16, wherein the instructions for using the second permutation table in the substitution box of the CMEA to generate a second substitution value comprises:

instructions for using the second permutation table in the substitution box during a forward pass of the CMEA.

20. The memory of claim 16, wherein the instructions for using the second permutation table in the substitution box of the CMEA to generate a second substitution value comprises:

instructions for using the second permutation table in the substitution box during a backward pass of the CMEA.

* * * * *

UNITED STATES PATENT AND TRADEMARK OFFICE
CERTIFICATE OF CORRECTION

PATENT NO.   : 6,768,797 B2
DATED        : July 27, 2004
INVENTOR(S)  : Rose, Gregory C.

It is certified that error appears in the above-identified patent and that said Letters Patent is hereby corrected as shown below:

Delete drawing sheet consisting of figure 2A and insert the attached drawing.

Signed and Sealed this

Seventh Day of February, 2006

JON W. DUDAS
*Director of the United States Patent and Trademark Office*